United States Patent [19]
Smith et al.

[11] Patent Number: 5,323,332
[45] Date of Patent: Jun. 21, 1994

[54] INSTRUMENT LANDING SYSTEM CALIBRATOR

[75] Inventors: Paul C. Smith, Huntington Beach; Richard McCormack, Brea; Michael Courtney, Westminster, all of Calif.

[73] Assignee: Infotec Development, Inc., Santa Ana, Calif.

[21] Appl. No.: 843,369

[22] Filed: Feb. 27, 1992

[51] Int. Cl.⁵ .......................................... H04B 17/00
[52] U.S. Cl. ..................... 364/571.01; 73/178 T; 455/226.4; 342/411; 340/870.04; 364/429; 364/551.01
[58] Field of Search ................... 364/424.01, 424.06, 364/428–430, 550, 551.01, 571.01; 244/186, 187, 189; 73/178 T; 340/870.04, 945.947, 976; 324/76.26, 76.28; 342/33, 34, 162, 173, 174, 407, 410, 411; 455/226.4, 67.3, 67.5, 67.7

[56] References Cited

U.S. PATENT DOCUMENTS

| | | | |
|---|---|---|---|
| 3,818,478 | 6/1974 | Groginsky | 343/106 R |
| 4,390,949 | 6/1983 | Beningfield et al. | 364/429 |
| 4,586,049 | 4/1986 | Davidson | 343/414 |
| 4,604,625 | 8/1986 | Davidson | 343/401 |
| 4,623,892 | 11/1986 | Enein | 342/411 |
| 4,719,581 | 1/1988 | Sakamoto et al. | 364/485 |

Primary Examiner—Jack B. Harvey
Assistant Examiner—Edward Pipala
Attorney, Agent, or Firm—Christie, Parker & Hale

[57] ABSTRACT

The Instrument Landing System Calibrator employs a combined analog radio frequency downconverter with a digital control system for analysis of difference in depth of modulation of tones generated by an instrument landing system localizer and glide slope transmitters. Signal sensitivity and accuracy is increased by elimination of system and phase noise present in purely analog designs and hybrid analog digital designs where digital signal processing is conducted at audio frequencies. Digital signal processing is conducted at video frequency with a single heterodyne from VHF and UHF frequency through selectable crystals. Selection of ILS channels is extended by the use of high speed video digital processing in conjunction with the use of selectable filters and selectable crystals to include all ILS channels. Interference between channels and from other radio navigation transmitters and FM stations is avoided by image rejection filtering employed by single radio frequency heterodyne and the increased selectivity of the video digital signal processing.

9 Claims, 10 Drawing Sheets

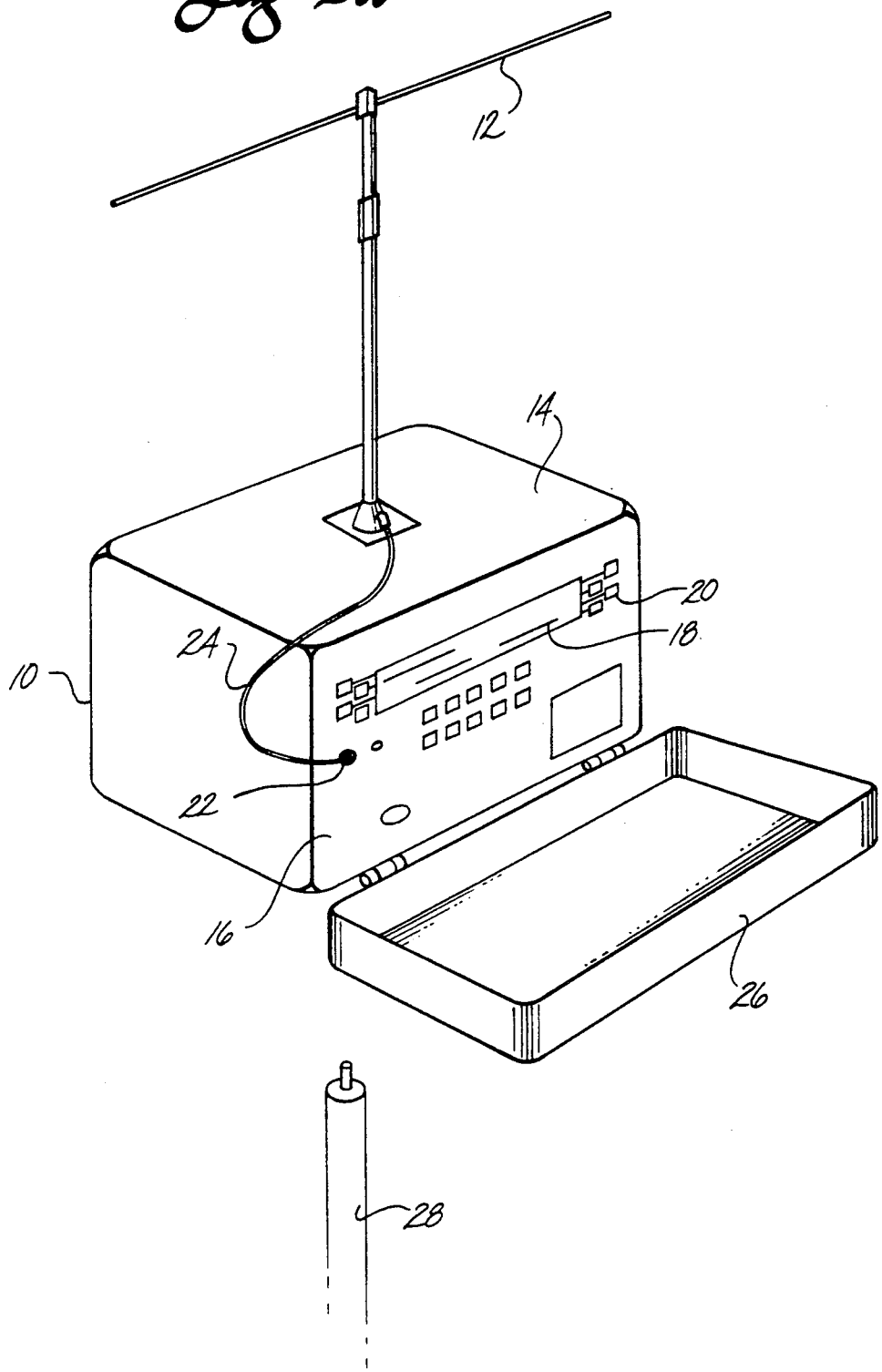

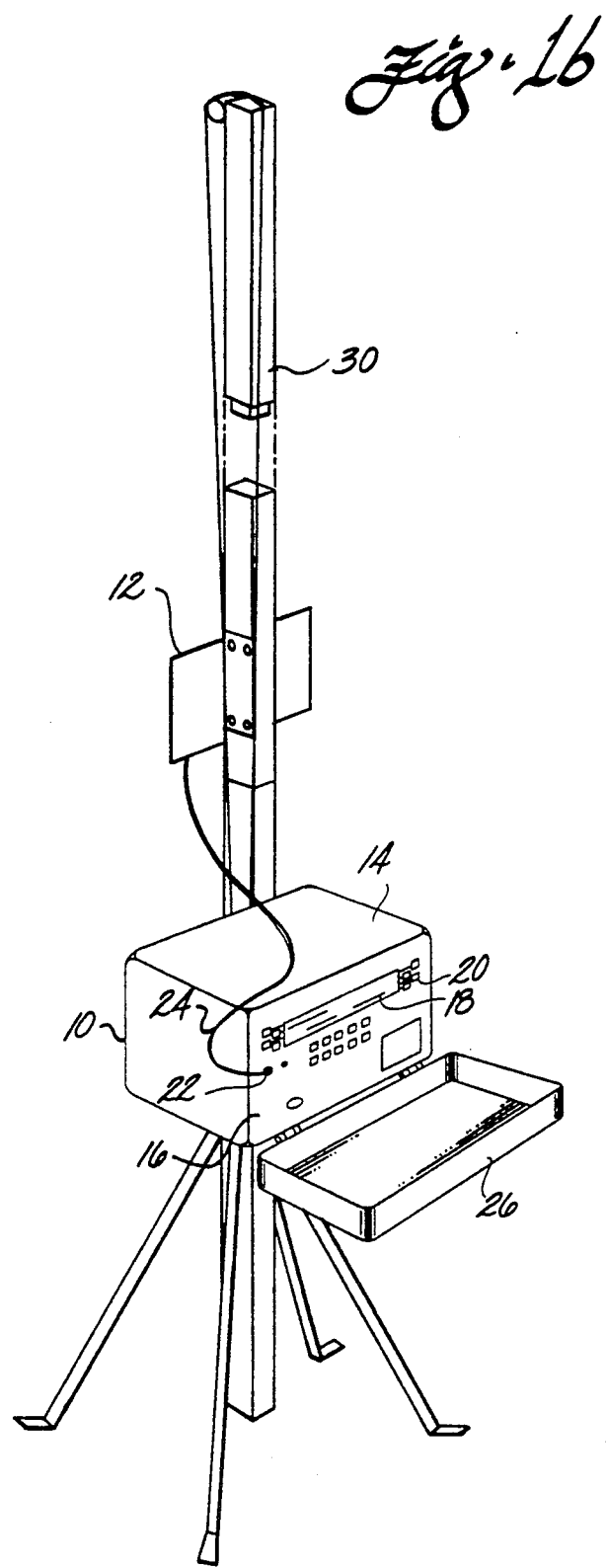

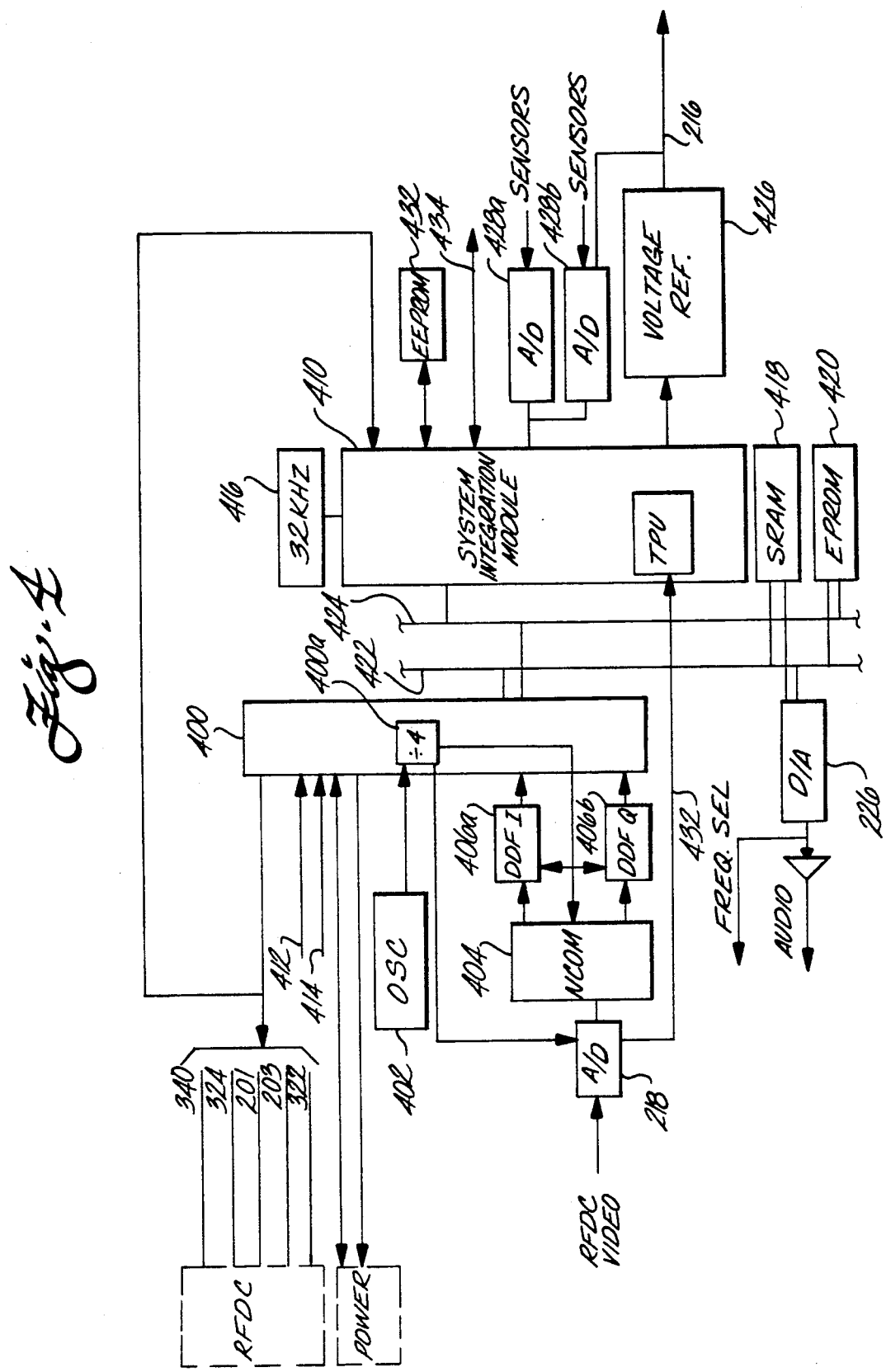

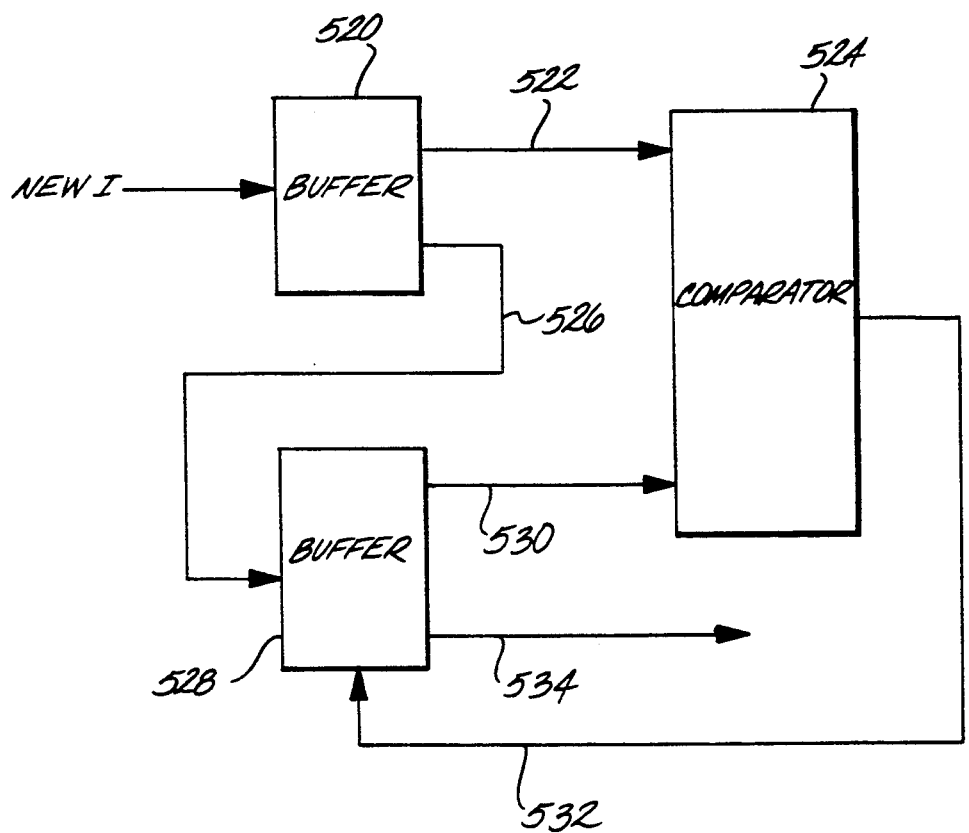

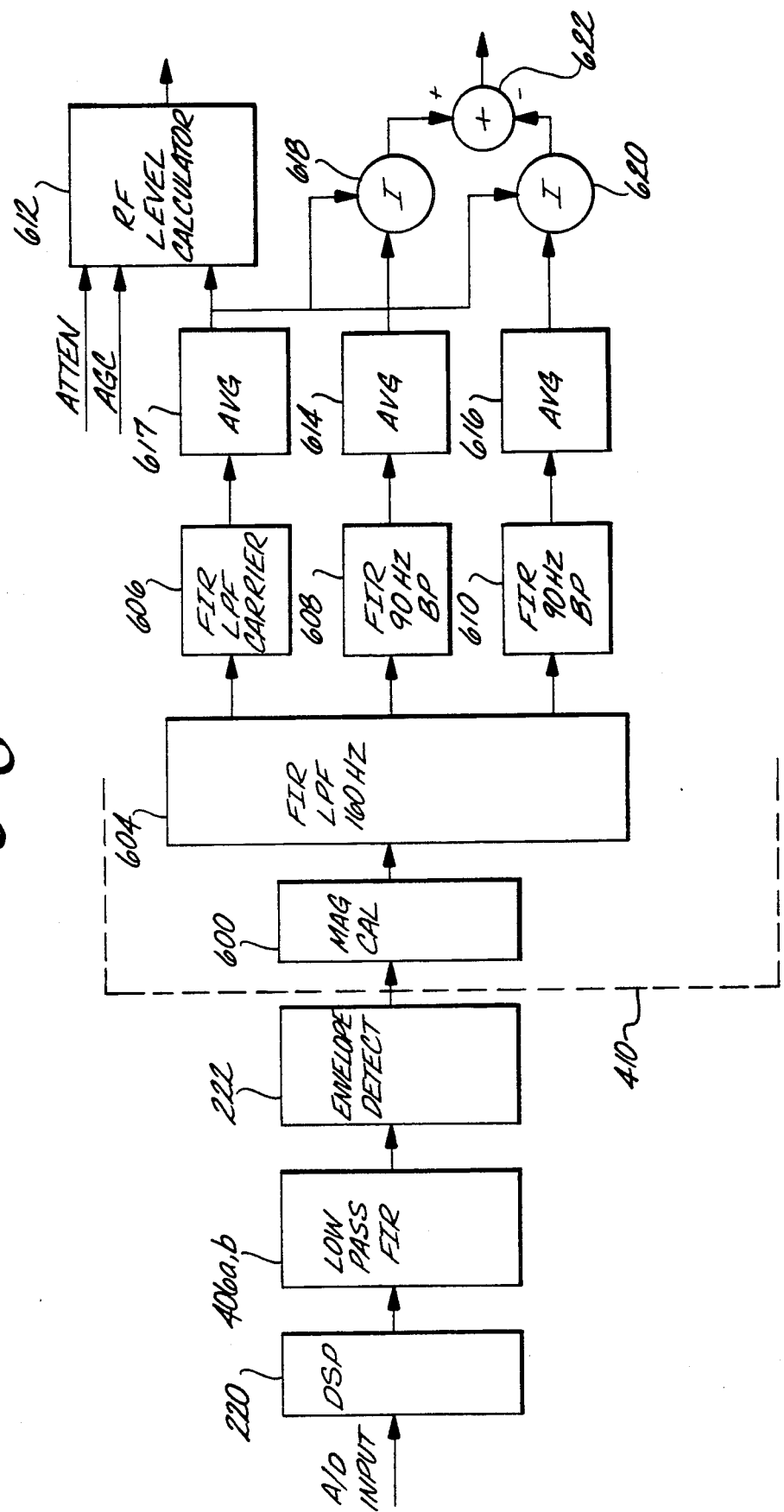

INSTRUMENT LANDING SYSTEM CALIBRATOR

FIELD OF THE INVENTION

The present invention relates generally to receiving and measuring radio frequency signals. In particular, the present invention employs in combination an analog radio frequency downconverter with a control system including a digital signal processor for the analysis of Difference in Depth of Modulation (DDM) of the tones generated by an instrument landing system localizer and glide slope transmitters.

DESCRIPTION OF THE PRIOR ART

Instrument Landing Systems are employed at numerous civilian and military airports. The Instrument Landing System, or ILS, employs a localizer signal which is transmitted on a VHF channel to identify a heading consistent with the center line of a runway and a glide slope signal transmitted on a UHF channel, which defines a glide path for aircraft approaching the runway. Modulation of the VHF localizer channel with a 90 Hz audio tone and a 150 Hz audio tone allows determination of course variance from the desired localizer course. If an aircraft approaching the runway is to the left of course the amplitude of the 90 Hz tone will predominate. Similarly, if the aircraft is to the right of the localizer course, the amplitude of the 150 Hz tone will predominate. Aircraft instrumentation is provided to determine the difference in amplitude of the modulation defined as Difference in Depth of Modulation (DDM) for conversion to an indication of relative position of the aircraft.

The glide slope UHF frequency is similarly modulated at 90 Hz and 150 Hz to provide above glide slope and below glide slope indications in a similar manner.

Calibration of the transmitters and antennas for the localizer and glide slope signals is critical to safe operation of the instrument landing system. Present calibration systems employing analog technology require high cost precision components for the design and fabrication of filters and other receiver components. Accuracy of the systems is often compromised by non-optimum measurement conditions, including temperature variations and interference from radio transmitters associated with other navigation functions and the commercial FM bands. Typically, use of analog components severely limits channel selection and often requires time consuming change out of components to obtain the desired calibration frequencies.

The present invention by combining digital signal processing techniques at video frequency in conjunction with a radio frequency downconverter employing a single heterodyne from VHF and UHF frequency facilitated by a set of selectable crystals under control of the digital processing subsystem eliminates the shortcomings of prior art systems. The present invention increases the signal sensitivity and accuracy by avoiding system and phase noise present in purely analog designs and hybrid analog/digital designs where digital signal processing is conducted at audio frequencies; system noise is reduced by quantizing and digitally processing signals with only one heterodyne stage; and use of plurality of selectable crystals for the local oscillator input to the heterdyne avoids phase noise present in digital and frequency synthesized local oscillators. The present invention reduces errors due to temperature and component variations and avoids the noise characteristics usually associated with additional heterodyning needed to select ILS channels by use of the video signal processing method. The present invention extends the selection of ILS channels by use of high speed video digital processing in conjunction with use of selectable filters and selectable crystals to include all ILS channels and reduces interference between these channels. The present invention reduces interference from other radio navigation transmitters and FM stations by the image rejection filter need for the single radio frequency heterodyne and the increased selectivity of the video digital signal processing technique.

SUMMARY OF THE INVENTION

The receiver system of the present invention incorporates an analog Radio Frequency Downconverter (RFDC) receiving VHF and UHF signals from an RF antenna. The RFDC includes preselect filters selectable by a control signal for determining the VHF or UHF band containing the channel to be measured. A plurality of attenuators, selectable by a second control signal, is used to adjust the signal for mixing. A local oscillator incorporating a plurality of crystals selectable by a third control signal provides the LO signal for mixing with the received signal. The Intermediate Frequency (IF) signal produced by the mixer is filtered employing a bank of band pass filters which are selectable by a fourth control signal to provide a one MHz block of channels for further quantization. The output signal level of the RFDC is adjusted through a gain control amplifier responsive to a fifth control signal to optimize analog-to-digital conversion of the signal.

The output of the RFDC is provided to a digital controller with digital signal processing for DDM calculation. The output of the RFDC is received in a analog-to-digital (A/D) converter for quantization of the signal at video frequencies. In-phase and quadrature signals are extracted from the digitized data using a numerically controlled oscillator multiplier. Digital decimation filters receive the in-phase and quadrature signals to low pass filter the data and define the ILS channel band width while reducing the data stream through decimation. Envelope detection is accomplished on the output of the DDFs through a digital sample and hold circuit to identify the modulation of the channel. The magnitude of the envelope is calculated and the detected envelope is digitally filtered using finite impulse response (FIR) filters at 0 Hz, 90 Hz, and 150 Hz in a microprocessor. Direct digital calculation of the DDM is accomplished based on the carrier amplitude and the net percentage of 90 Hz and 150 Hz tone present. The control signals for the filtering, attenuation and gain control in the RFDC are provided by the microprocessor. The gain setting and attenuater setting are employed in the carrier level calculation.

Buffering of signals in the invention between the A/D converter, NCOM, DDF's, and microprocessor is accomplished in a programmable logic cell array, which further incorporates peak & hold circuitry for envelope detection. The Logic Circuit Array (LCA) is programmed at power-up by the micro processor. The DDM calculated output is provided to a display or audio output for communication to an operator.

BRIEF DESCRIPTION OF THE DRAWINGS

The features of the present invention are more clearly understood with reference to the following drawings.

FIG. 1a is a pictoral drawing of the present invention incorporated in a portable calibration unit configured for measurement of a localizer signal.

FIG. 1b is a pictoral drawing of the portable calibrator unit incorporating the invention configured for measurement of a glide slope signal.

FIG. 4 is a detailed block diagram of the digital signal processor and controller.

FIG. 6 is a block diagram of the signal processing flow for calculation of the DDM in the ILS signal.

DETAILED DESCRIPTION

Figure 2:
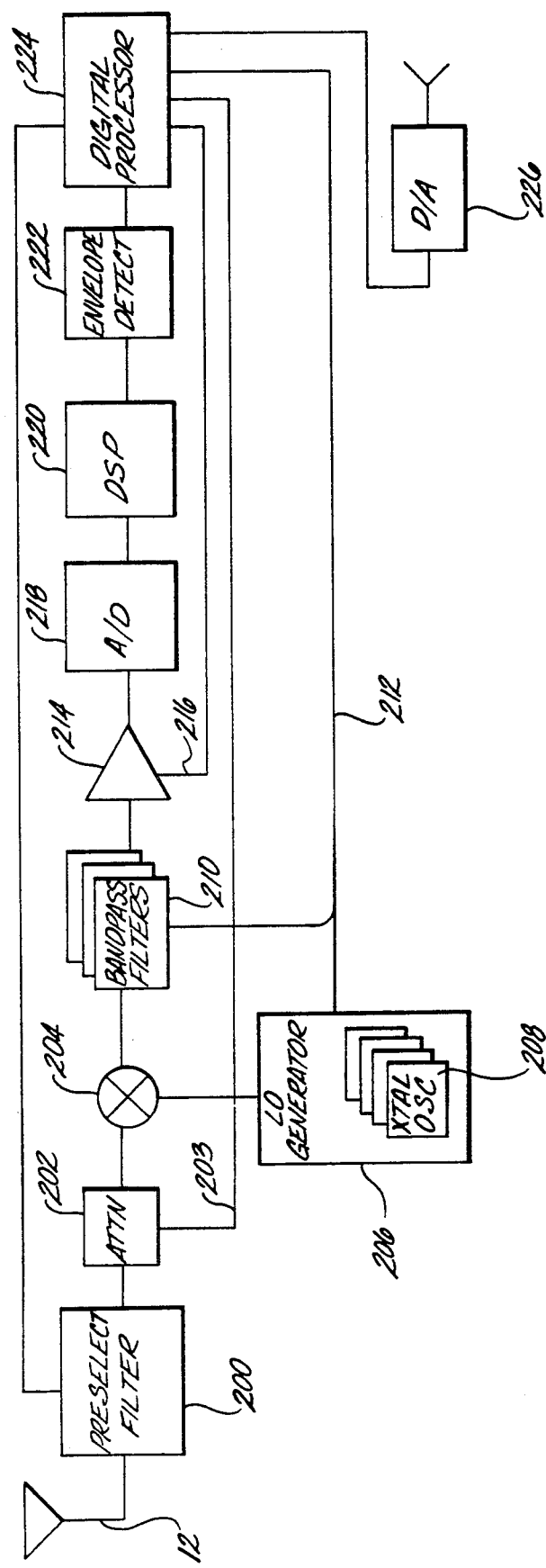
FIG. 2 is a function block diagram of the elements of the present invention incorporated in the analog RF downconverter and controller with digital signal processing.

Referring now to the drawings, FIG. 1a shows an embodiment of the present invention incorporated in a portable calibration system. The calibration system 10 receives and RF signal from an antenna 12 which is removably mounted to the top surface of the case 14 enclosing the calibrator. A front panel 16 includes a digital display 18, with control options keyed to selection switches 20 and an RF signal input 22. The selection switches provide a variable function key interface for ease of use by the operator. A coaxial cable 24 provides the RF signal from the antenna to the RF input. A hinged cover 26 is provided to enclose the front panel of the portable calibrator unit when not in use. A support stand 28 with a threaded fitting for insertion in a mating fitting in the bottom of the calibrator case is provided for supporting the calibrator during measurements.

FIG. 1b shows the portable calibration unit attached to an antenna extension mast 30 for use in measurement of glide slope information for which elevation of the antenna is required.

A functional description of the present invention is provided in FIG. 2. The RF signal is received on the antenna 12. The RF signal is passed through a preselect filter 200 for interference rejection including signal images and undesirable out-of-band signals, such as FM. The filtered signal is provided to an attenuator 202, which will be described in detail subsequently. Selected attenuation of the signal provides an appropriate output for further processing of the signal. A control signal 203 is employed to select the appropriate level of attenuation. The input signal is then converted from RF to video in a mixer 204 using a local oscillator generator 206, which incorporates crystal oscillators 208. Mixing of the selected LO provides one MHz block conversion of the input signal. Band pass filters 210 are employed to further refine the signal. The plurality of band pass filters and crystal oscillators are selectable using a control signal 212 to obtain the desired one MHz block of channels.

An amplifier 214 receives the one MHz block signal from the band pass filter to adjust the signal level for optimum processing in the digital controller circuit. A control signal 216 is employed for gain control on the amplifier. The output signal from the RF downconverter is provided to the digital controller and received in an A/D converter 218. The A/D converter digitizes the signal, quantizing the video data in a multiple bit digital representation. A digital signal processor 220, which will be described in greater detail subsequently operates on the digitized signal to isolate the specific ILS channel received. An envelope detector 222 digitally detects the modulation envelope of the channel signal and provides the envelope data to a processor 224 for DDM determination by digital analysis using 1020, 150, 90, and 3 Hz finite impulse response filters to isolate the audio, ILS channel and carrier power levels. The processor provides the control signals for selection of attenuation and frequency block based on operator inputs from a front panel shown in FIG. 1a based on the ILS channel being measured. The processor also provides the control signal for gain control of amplifier 214 to allow optimizing of the number of bits in the A/D for maximum accuracy. The DDM value calculated is provided by the processor to a display on the front panel for viewing by the operator. The ILS tones are reconverted by the processor through a D/A converter 226 to an audio signal for use by the operator.

Figure 3A:
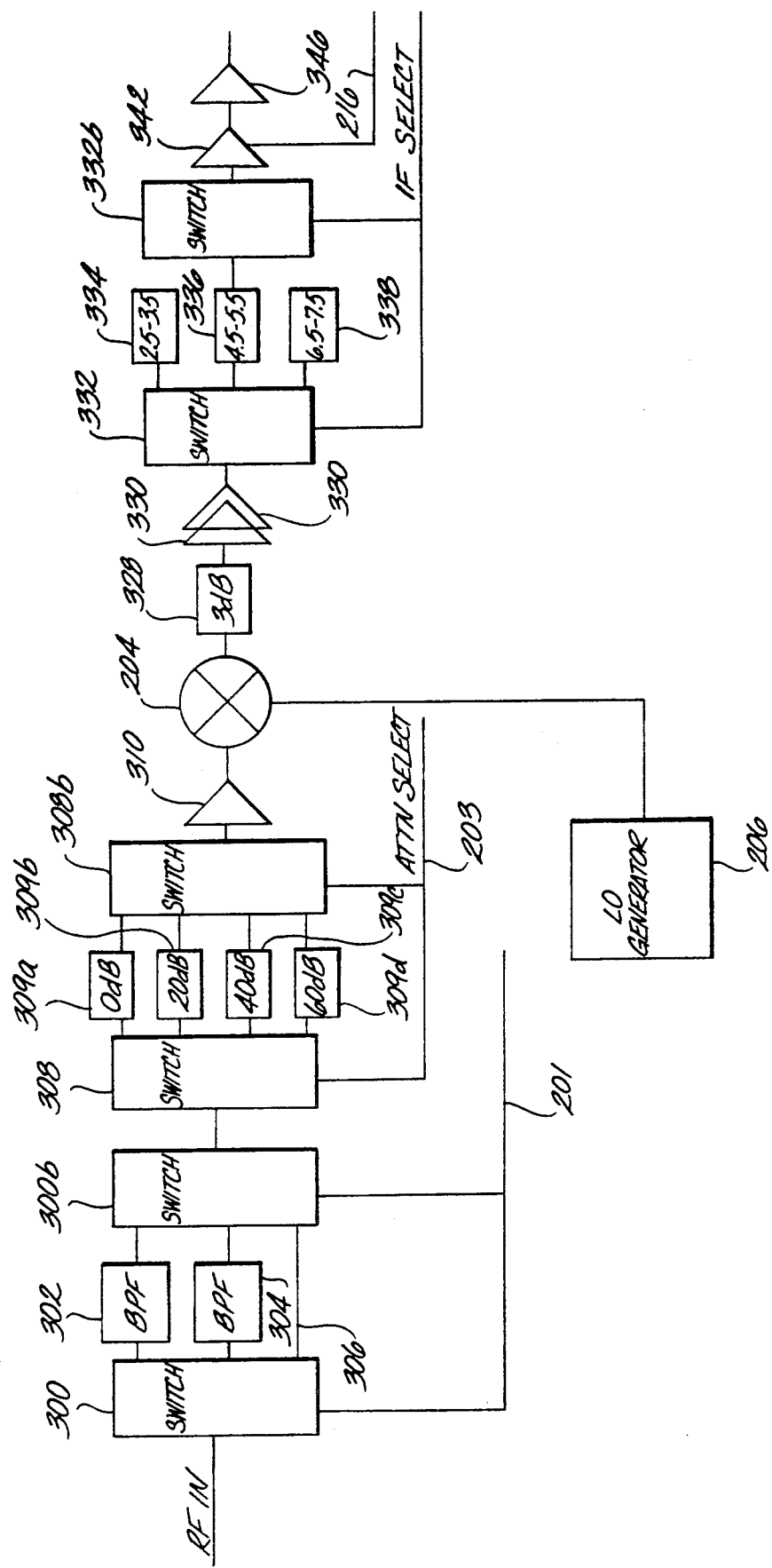
FIG. 3a is a detailed block diagram of the RF downconverter.

The RF downconverter for the embodiment shown in FIG. 3, receives the RF input in a switch bank 300. The filter select signal provided by the processor controls the switch bank to select a band pass filter based on the signal to be measured comprising a localizer channel or glide slope channel. As defined in Table 1, localizer channels having frequencies between 108.1 and 111.95 MHz, are transmitted with band pass filter 302 while glide slope signals in a band from 329.15 to 335.0 MHz are transmitted by selecting band pass filter 304. A bypass 306 may be selected by the processor to pass all frequencies. In the embodiment shown, the preselect filter employs two helicoil air transmission RF filters. In the embodiment shown, the filter select signal comprises three selection bits, one for selection of each filter.

The filtered signal passes through the second portion of the switch bank 300b to a second switch bank 308 for attenuation of the signal based on peak value detected by the controller, as will be described in greater detail subsequently. The attenuation selection signal from the controller enables the switch bank to select one of four attenuation levels, 0 dB, 20 dB, 40 dB, and 60 dB. The attenuation select control signal comprises a two-bit decoded signal for selection of the four attenuators. The attenuated signal passes through the second half of the switch bank 308b to a temperature compensated low noise amplifier 310. In the embodiment shown, a fixed 3 dB attenuation, in combination with the low noise amplifier, prepares the signal for mixing.

The processed RF signal is then provided to the mixer 204 where it is heterodyned with the output of the local oscillator generator 206. The output of the mixer provides the Internal Frequency (IF) for use in the remainder of the system.

Figure 3B:
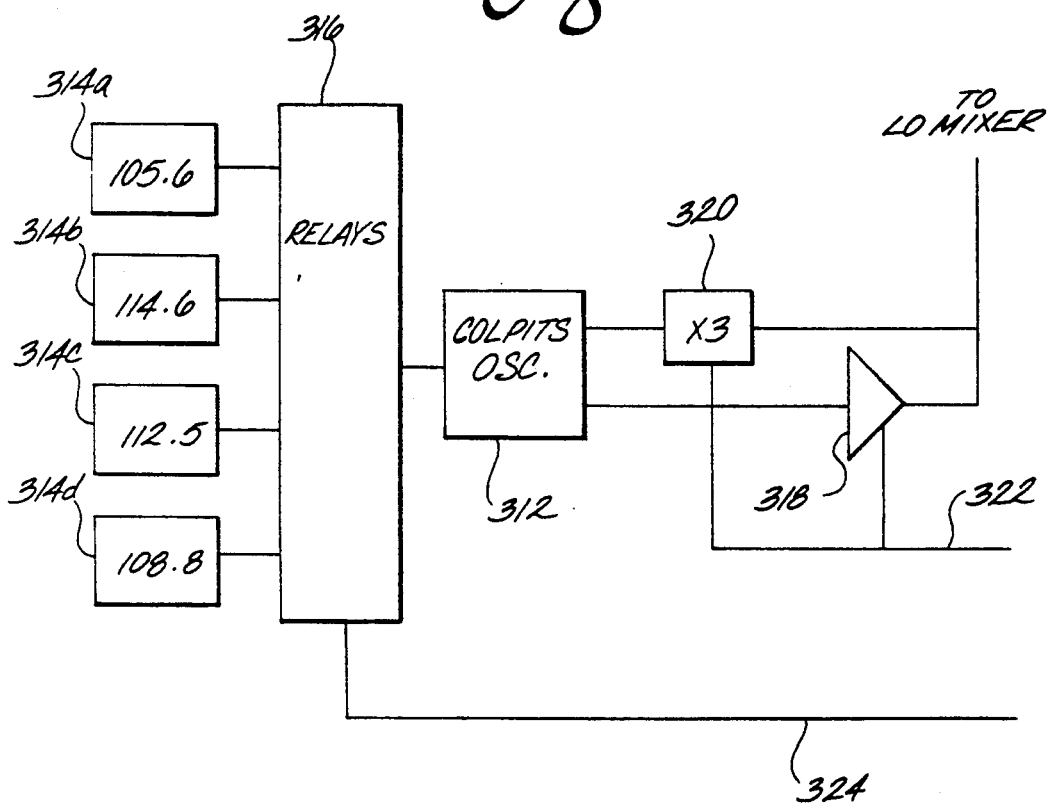
FIG. 3b is a block diagram for one embodiment of the local oscillator circuit.

The local oscillator generator in the invention incorporates crystal oscillators for a high degree of phase stability and interference rejection. A first embodiment of the LO generator is shown in FIG. 3b which employs a Colpitts oscillator 312. Four crystals operating at 105.6 MHz, 114.6 MHz, 112.5 MHz, and 108.8 MHz designated 314a–d respectively are connected through relays 316 to the Colpitts oscillator. The output of the Colpitts oscillator is applied to a 20 dB impedance buffer 318 and a frequency tripler 320, which incorporates a 30 dB impedance buffer. Selection of the output signal from the Colpitts oscillator through the frequency tripler or buffer is provided by a control signal 322. Selection of the buffer provides a local oscillator signal for the localizer frequencies as shown in Table 1 in combination with selection of the 105.6 MHz or 114.6 MHz crystals by control signal 324 operating the relays for local oscillator selection as previously described. The LO select control in the present embodiment comprises a four-bit decoded signal for selection of the four crystals. A first-bit defines glide slope LO selection while a second-bit defines localizer LO selection. The third bit identifies the first frequency of the pair, e.g. 105.6 for localizer and 112.5 for glide slope, while the fourth-bit identifies the second LO frequency, e.g. 114.6 for the localizer and 108.8 for the glide slope.

Selection of the frequency tripler and associated buffer provides the local oscillator signal for glide slope frequencies as shown in Table 1 by selection of the 108.8 MHz or 112.5 MHz crystals operated on by the frequency tripler to produce 326.65 MHz or 337.65 MHz signals for heterodyne mixing.

TABLE 1

| INPUT | RF | LO | IF |
| --- | --- | --- | --- |
| Localizer | 108.1–109.1 | 105.6 | 2.5–3.5 |
|  | 109.1–110.1 | 114.6 | 5.5–4.5 |
|  | 110.1–111.1 | 105.6 | 4.5–5.5 |
|  | 111.1–111.95 | 114.6 | 3.5–2.5 |
| Glide Slope | 329.15–330.15 | 326.65 | 2.5–3.5 |
|  | 330.15–331.15 | 337.65 | 7.5–6.5 |
|  | 331.15–332.15 | 326.65 | 4.5–5.5 |
|  | 332.15–333.15 | 337.65 | 5.5–4.5 |
|  | 333.15–334.15 | 326.65 | 6.5–7.5 |
|  | 334.15–335.00 | 337.65 | 3.5–2.5 |

Figure 3C:
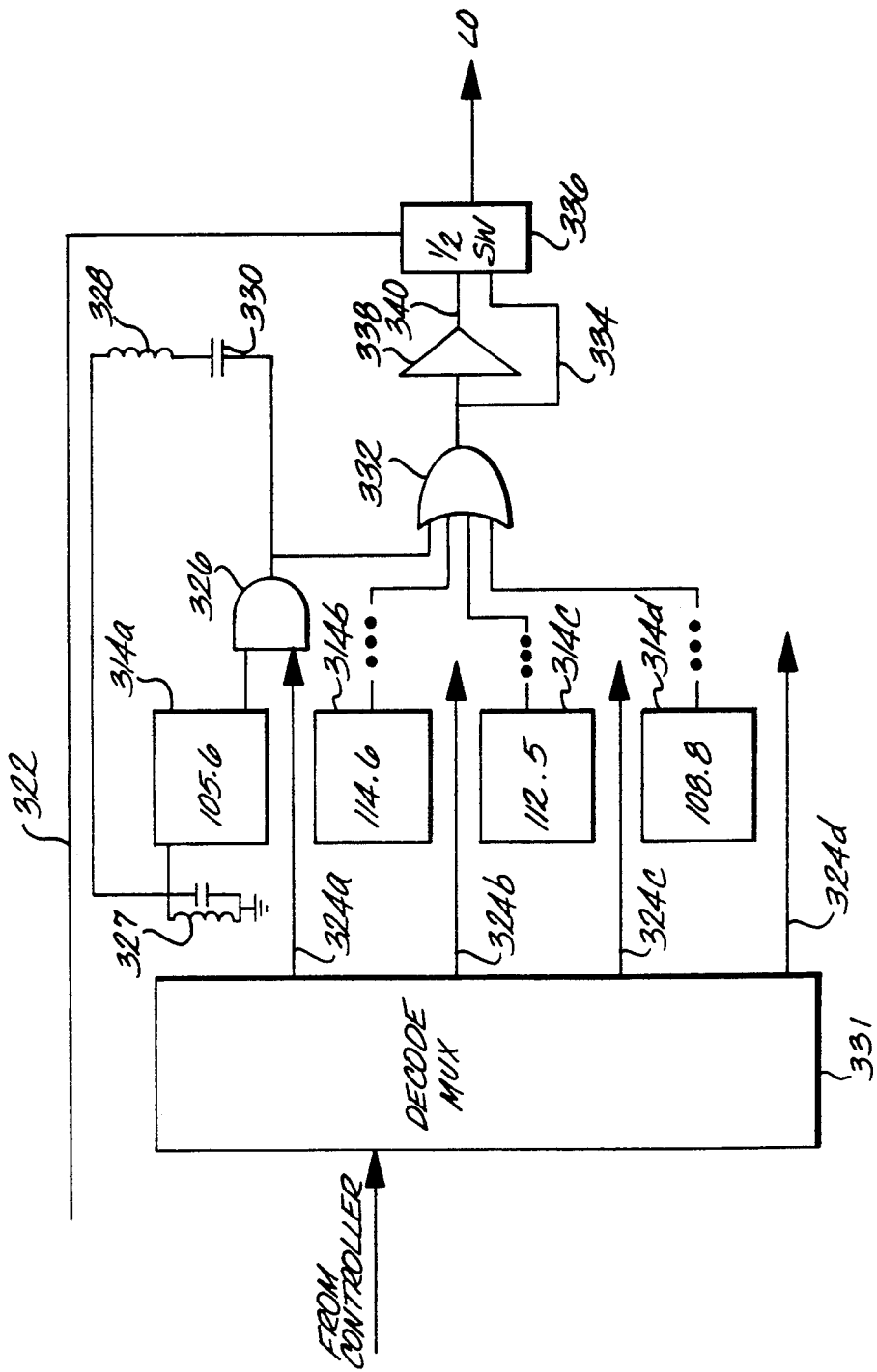
FIG. 3c is a block diagram for one embodiment of the LO generator.

A second embodiment of the LO generator, as shown in FIG. 3c, comprises a crystal ring oscillator including four crystals 324a–d, identical to those previously described with respect to the Colpitts oscillator, and crystal selection logic forming a ring oscillator configuration. The ring oscillator is implemented by a high-speed quint AND gate with the crystal, an inductor 328, and a capacitor 330 in the feedback path between the output and one input of the AND gate 326 (shown only for the first crystal). A tank circuit 327 connected between ground and the input sustains the oscillation frequency. The oscillator synchronizes to the crystal frequency connected to one input of each AND gate. The second input of each AND gate is enabled by the LO select signals decoded by multiplexer 331 as previously described and shown as 324 a, b, c, and d in FIG. 3c described. The outputs of the AND gates are connected to an OR gate 332, which passes the active LO through. The output of the OR gate is a square wave containing several harmonics. The fundamental frequency is used for the localizer LO signals by selection of input 334 to switch 336. The third harmonic is amplified in amplifier 338 and provided on input 340 of switch 336 for the glideslope LO signals.

As shown in Table 1, the IF produced by the mixer comprises signals at 2.5 to 3.5 MHz, 4.5 to 5.5 MHz, and 6.5 to 7.5 MHz. In the embodiment shown in the drawing, output of the mixer is balanced by a 3 dB attenuator 326 and two 18 dB amplifiers 328 and 330. The balanced signal is then provided to a video switch 332, which selects one of three band pass filters 334–338, which correspond to the appropriate IF produced by the mixer. An output video switch 332b and the input video switch 332 are selected by a control signal 340, which in the embodiment shown, comprises a three-bit control signal with each bit selecting one filter.

The control signals comprising the LO select signal 324 localizer glide slope select signal 322 and IF select signal 340 are combined in alternate embodiments with appropriate decoding as the second control signal 212 of FIG. 2.

The filtered video is processed through a first controllable amplifier 342 controlled by a variable voltage control signal 344 for automatic gain control (AGC). A second 30 dB gain amplifier 346 provides the final level for the video signal which is AC coupled to center the one volt peak-to-peak video signal on zero volts DC. The processed video signal from the RF downconverter is provided to the digital controller, which is shown in detail in FIG. 4.

The IF signal is provided from the RF downconverter to the A/D converter 218. In the first embodiment, a 12-bit A/D converter operating at 16.6 Mhz as produced by Signal Processing Technologies with part no. SPT 7810 with a signal to noise ratio of 58 dB is employed and provides direct sampling of all IF produced by the RFDC and requires a single low pass filter in lieu of the three bandpass filters 334, 336, and 338. A second embodiment employing a ten-bit A/D converter as produced by Analog Devices with part no. AD 773 operating at 4 Mhz provides bandpass sampling of IF signals with fold-over of the undersampled frequencies based on the one Mhz limited bandwidth of each bandpass filter 334, 336, and 338 operating point.

Digitized data is provided from the A/D converter to a logic cell array (LCA) 400, which will be described in greater detail subsequently. The digital data buffered by the LCA is provided for digital signal processing to a Numerically Controlled Oscillator Multiplier (NCOM) 404 for translation of the ILS channel being processed into the audio frequency spectrum. The NCOM multiplies incoming digital values with sine and cosine values from a look-up table to create in-phase and quadrature components of the digital data. The NCOM provided in the embodiment shown is a Harris model HSP45116 providing 20 bits of output data. The 20 bits of digital data is provided to digital decimation filters (DDF) 406 for the in-phase and quadrature components. Harris model HSP43220 DDF's are employed in the embodiment shown in the drawings. The NCOM and in-phase and quadrature DDFs with the buffering of the logic cell array comprise the digital signal processing for channel selection of FIG. 2. The DDFs provide low pass filtering of the in-phase and quadrature data from the NCOM to define the ILS channel bandwidth and to reject any unwanted mix products from the NCOM. Data decimation by the filter reduces the data processing requirements downstream. Control registers in the NCOM are set for translation frequency, and control registers in the DDFs are set for bandwidth ripple and decimation by the System Integration Module (SIM) 410, which comprises a Motorola MC68332 microprocessor in the embodiment shown in the drawings.

The SIM provides the IF select, LO select, band select, attenuation select, and localizer/glide slope select control signals through the logic cell array to the RFDC. The LCA additionally provides an interface to the SIM for the front panel switch matrix 412 and encoded key inputs 414 for communication with the operator. Selection of ILS localizer and glide slope channel, by the operator, on front panel switches is detected by the SIM which generates corresponding control signals to the RFDC. The present SIM operates with a 16 MHz system clock activated by a 32 kilohertz crystal 416. Two kilobytes of Static Random Access Memory (SRAM) is provided in the SIM. 64 kilobytes of SRAM 418 is provided for data storage in the invention with a 256 kilobyte EEPROM for control software for the SIM. A 16 bit address bus 422 and a 16 bit data bus 424 provide communication between the SIM, memories and logic cell array.

A programmable voltage reference 426, consisting of a programmable potentiometer and precise voltage reference, generate the gain control signal 216 for control of the AGC amplifier at the output of the RFDC.

Figure 5A:
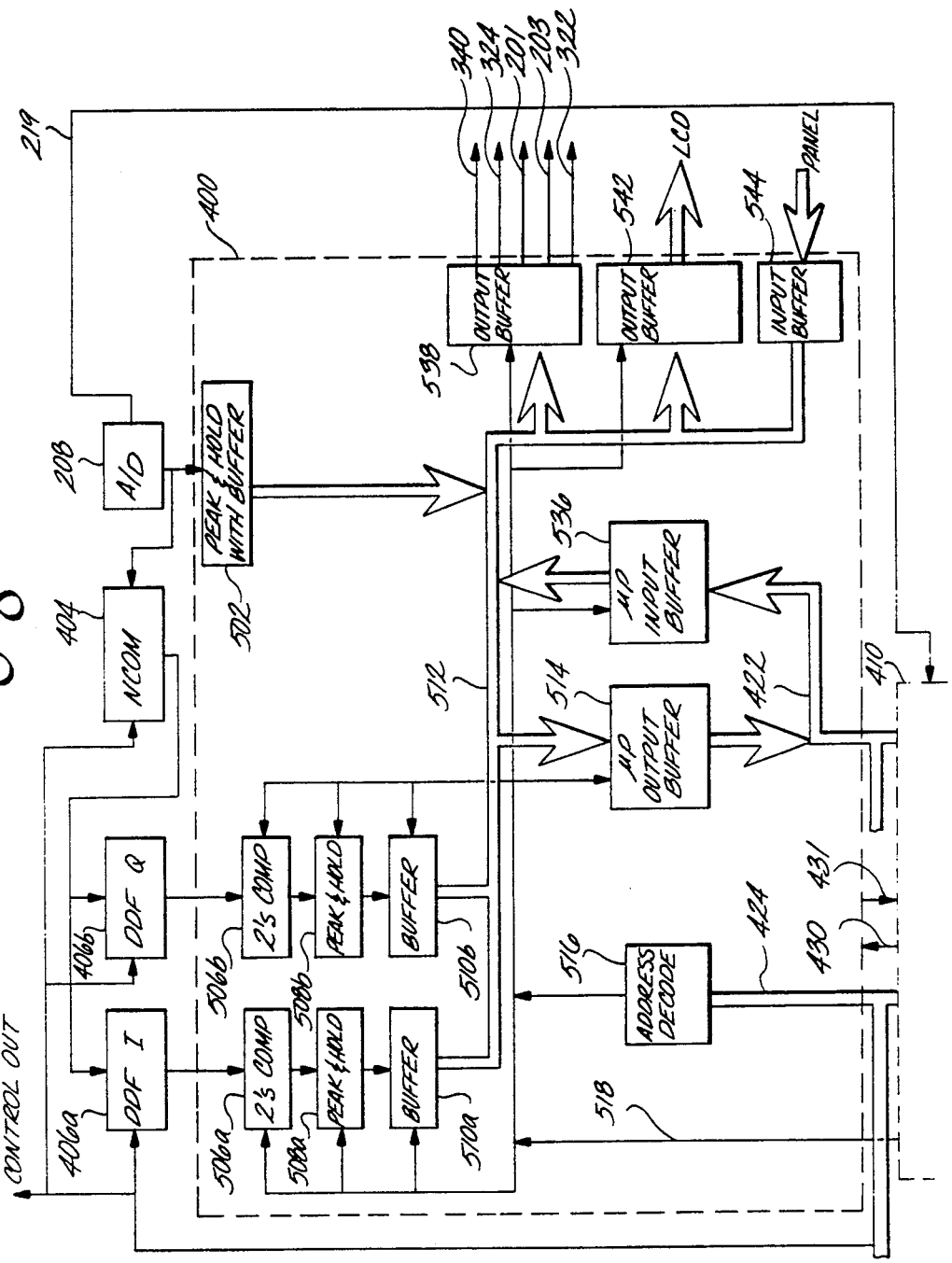
FIG. 5 is a detailed block diagram of the logic cell array configured for operation in the present invention.
FIG. 5b is a block diagram of one embodiment of the peak hold circuit configured in the LCA.

Iteration of initial inputs form the RFDC through the A/D converter allows adjustment by the microprocessor of the attenuation select controls and the gain control for optimum video outpum from the RFDC. As shown in FIG. 5a, the TPU function of the SIM 432 is used in one embodiment to count the number of overflow pulses generated by the DSP A/D converter 218 provided to the SIM on line 219. The gain is initially set to mid-range and the attenuators switched out. Attenuation is then added until the overflow pulses are not detected; this method ensures that the low noise amplifier in the LNA is not overdriven. Gain is then added until a small number of overflow pulses is detected.

A second embodiment uses a peak circuit implemented in the LCA to be described subsequently for A/D converters not providing an overflow function.

A second A/D converter 428, having a capability of 16 channels receives environmental and temperature data to estimate battery life, sense the need for display backlighting, and provide built in test data to verify correct operation. In the embodiment shown, two Linear Technology 1094 8 channel A/D converters are use.

Control of the viewing angle is controlled in similar fashion to the gain of the video signal. A programmable voltage reference is used to change the optimum viewing angle based upon operator key inputs.

The logic cell array provides data interface and buffering for the A/D converter, digital signal processing elements, SIM, front panel switch matrix, and the display drivers. The configuration of the LCA is shown in detail in FIG. 5a. In the embodiment shown in the drawing, a Xilinx model 3090 is used. The LCA is dynamically configured by a load stream 430. The load stream for configuration of the LCA in the embodiment shown in the drawings, is attached hereto as Appendix A.

Digitized data from the A/D converter is received in the LCA in a peak & hold buffer 502. Data from the buffer 502 is sampled by the SIM to determine the level of video signal present. Data from the A/D is also provided to the NCOM for processing. The output of the NCOM is provided to the in-phase and quadrature DDF filters 406a and 406b. Following the in-phase data path, the output of the DDF is rectified using a twos compliment circuit 506a and provided to a peak detection and hold circuit 508a. Data from the peak & hold is temporarily stored in an input buffer 510a. Data from the quadrature DDF is similarly processed through components 506b, 508b, and 510b. The buffer outputs are provided to a tristate bus 512 internal to the LCA. A microprocessor output buffer 514 receives the data from the internal tristate bus for transfer to the SIM through the data bus as previously described with regard to FIG. 4.

The SIM controls transfer of data internal to the LCA through addresses provided on the address bus 424 which are received in the LCA in an address decode circuit 516. Control lines 518 from the SIM provide read, write, and other appropriate control signals in combination with the address decode for operation of the elements of the configured LCA the NCOM and DDF chips, and other chips select signals external to the LCA.

The sampling frequency of the peak & hold circuits for the in-phase and quadrature data is continuously variable to 6000 hz depending upon the frequency of the signal of interest. Sampling of I-channel data only at 6000 Hz is used to reproduce audio data. The rectifier and peak & hold circuits of the LCA, in combination with the various buffers, constitutes the envelope detection circuit 222 of FIG. 2.

The embodiment of the peak & hold circuits employed in the configured LCA is shown in detail in FIG. 5b. Again, following the in-phase data stream, new in-phase data is provided to a buffer 520. Data from the buffer is provided on a first output 522 to a comparator circuit 524. A second output from the buffer 526 provides the input to a gated second buffer 528 holding the peak value. A first output 530 from the second buffer is provided to the comparator for comparison with the new in-phase data present in the first buffer. If the magnitude of the new data exceeds the current peak value, the comparator provides a gating signal 532 to the second buffer allowing the new value to be written. A second output 534 connects the peak value buffer to the input buffer 510a of FIG. 5a.

A microprocessor input buffer 536 receives data from the SIM on the data bus for the various RFDC control signals discussed with regard to FIG. 4. An output buffer 538 receives these signals for transmission to the RFDC. Connection of the microprocessor input buffer to the output buffer is made through the internal tristate bus of the LCA. Control feedback is provided to the SIM as shown in FIG. 4 for monitoring.

A second output buffer 542 receives data from the SIM through the microprocessor input buffer and tristate bus for transmission to the display drivers and a fourth input buffer 544 receives data from the front panel switches for transmission through the tristate bus and microprocessor output buffer to the SIM. Portions of buffers 502 and 504 are connected to the tristate bus to receive control values from the SIM through the microprocessor input buffer for operation of the NCOM and in-phase and quadrature DDF's respectively. The NCOM and DDF's receive control signals from the address decode circuit for timing control on transfer of this data. Table II provides a correlation of address provided by the SIM and the device/function enabled through the LCA for the embodiment shown in the drawings.

TABLE II
Address Summary

| Address (Hex) | Device/Function |
| --- | --- |
| 100000 | LCA Program |
| 100005 | LCA RF Controls |
| 100002 | LCA LCD Controls |
| 100003 | LCA LCD Controls |
| 100004 | LCA LCD Controls |
| 100010 | LCA LCD Controls |
| 100008 | LCA AGC Monitor |
| 100006 | LCA DDF I Channel |
| 100007 | LCA DDF Q Channel |
| 10000A | LCA I/O bus |
| 110000 | DAC Gain |
| 118000 | DAC Audio/VCO |
| 10XXXX | LCA Power Module Controls |
| 120000 | DDF I "F" Register |
| 120002 | DDF I "FC" Register |
| 120004 | DDF I "H1" Register |
| 120006 | DDF I "H2" Register |
| 120000 | DDF Q "F" Register |
| 120002 | DDF Q "FC" Register |
| 120004 | DDF Q "H1" Register |
| 120006 | DDF Q "H2" Register |
| 128000 | NCOM Frequency LSB Register |
| 128002 | NCOM Frequency MSB Register |
| 128004 | NCOM Phase Register |

The DDF F register is employed by the software in the SIM to set the number of taps, amount of decimation, and FIR symmetry. The DDF FC register is employed by SW to provide the coefficients of the digital filter that define the filter passband. The H registers are used to set the decimation and growth rate of secondary filters in the DDFs. The NCOM Frequency registers are used to set the center frequency for digital downconversion implemented by the NCOM. The NCOM phase register is used to add phase velocity to the digital downconversion although this is not required in the ILS calibrator application.

Operation of the SIM for calculation of the DDM is shown in FIG. 6. The data from the A/D converter is operated on by the digital signal processing circuitry for channel selection and base band conversion as described previously. Envelope detection by the circuits in the LCA provides to the SIM the envelope data for further processing. A magnitude calculation 600 for the envelope is made based on the in-phase and quadrature envelope data. A first low-pass Finite Impulse Response filter (FIR) is formed digitally in the DDF with a bandwidth of 40 KHz. Magnitude data is then acted upon by a digital FIR 604 having a center frequency of 160 Hz. These filters eliminate noise outside the operating bandwidths of the DDF's and NCOM, peak & hold sampling, and modulation frequencies. The output of the 160 Hz FIR is provided to three FIR's 606, 608, and 610 formed by the microprocessor for filtering of the carrier, 90 Hz modulation signal, and 150 Hz modulation signal respectively. The microprocessor conducts an RF level calculation 612 employing the output of the carrier FIR, as averaged in calculaton 617, with the known attenuator settings and amplifier gain setting commanded by the SIM as previously described. The output of the 90 Hz FIR undergoes an averaging calculation 614 which is combined with the averaged carrier by division 618 to provide percent modulation for the 90 Hz signal. The output of the 150 Hz FIR undergoes an averaging calculation 616 which after combination with the averaged carrier by division 620 provides a percent modulation for the 150 Hz signal. DDM of the ILS signal is then calculated by subtracting the 150 Hz modulation from the 90 Hz modulation in summer 622.

General operation of the entire system of present invention is accomplished by input of the desired ILS channel frequency information by an operator on the front panel of the device. As described with respect to FIG. 5a, this data is received through the LCA and processed by the SIM to set the local oscillator IF select, band select, attenuator select, and LOC/GS select signals for control of the RFDC. Initial data received from the RFDC is employed by the SIM to adjust the attenuation and gain (AGC) for optimum accuracy in the internal A/D. The in-phase and quadrature data of the envelope is digitally mixed and filtered through the NCOM and DDF circuits and the envelope of the in-phase and quadrature data is sampled at forty KHz by the envelope detection circuits in the LCA. The in-phase and quadrature data is provided to the microprocessor in the SIM where magnitude of the signal is calculated. The magnitude data is operated on by digital finite impulse response filters to obtain values for the three Hz carrier signal and 150 Hz and 90 Hz modulation signals from which the DDM is calculated. The calculated value is then output from the SIM through the LCA to the LCD display for the operator.

Having now described the invention in detail as required by the patent statutes those skilled in the art will recognize modifications and substitutions to the embodiments of the invention disclosed and alternate embodiments for different purposes than the calibrator disclosed herein. Such modifications and substitutions are within the scope and intent of the invention as defined in the following claims.

What is claimed is:

1. A radio frequency channelized receiving and measurement system comprising:
   an analog radio frequency down converter having
      preselect filter means for selecting a signal band for a received signal,
      a local oscillator having a plurality of crystals selectable by a control signal to produce a local oscillator signal,
      mixing means for combination of the filtered received signal and the local oscillator signal to produce an IF signal,
      means for bandpass filtering the IF signal, and
      means for controlling the gain of the filtered IF signal to produce an output from the down converter; and,
   a digital controller receiving the output of the down converter and having
      an analog-to-digital converter for quantizing the down converter output to produce a digital output,
      means for extracting in-phase and quadrature signals from the digital output,
      a first digital decimation filter operating on the in-phase signal to produce an in-phase decimated signal,
      a second digital decimation filter operating on the quadrature signal to produce a quadrature decimated signal,
      a first means for detecting an envelope of the in-phase decimated signal,
      a second means for detecting an envelope of the quadrature decimated signal, means for calculating an envelope signal magnitude from the detected in-phase and quadrature envelopes, a first digital finite impulse response filter at a carrier frequency receiving the envelope signal magnitude and providing a carrier output, a second digital finite impulse response filter at a first modulation frequency receiving the envelope signal magnitude and providing a first modulation value, a third digital finite impulse response filter at a second modulation frequency receiving the envelope signal magnitude and providing a second modulation value, means for calculating RF level from the carrier output, and means for calculating DDM from the RF level, the first modulation value and the second modulation value.

2. A radio frequency channelized receiving and measurement system as defined in claim 1 further comprising:

means for selectively attenuating the received signal intermediate the preselect filter means and the mixing means.

3. A radio frequency channelized receiving and measurement system as defined in claim 2 wherein the attenuation means comprises:

a plurality of attenuators of differing values, selectably connectable through a switch means wherein said switch means is responsive to a second control signal.

4. A radio frequency channelized receiving and measurement system as defined in claim 3 wherein the band pass filtering means comprises:

a plurality of bandpass filters selectably connectable through a switch means, the switch means controllable by a third control signal.

5. A radio frequency channelized receiving and measurement system as defined in claim 1 wherein the envelope detection means is incorporated in a programmable logic circuit array.

6. A radio frequency channelized receiving and measurement system as defined in claim 4 further comprising:

input means for selection of a frequency of a channel to be measured; and the digital controller further comprises:

means for receiving the selected channel from the input means;

means responsive to the receiving means for issuing the control signal and third control signal for selection of the crystal and band pass filter respectively responsive to the input channel; and an output means for displaying the DDM value from the DDM calculating means.

7. A radio frequency channelized receiving and measurement system as defined in claim 6 wherein the gain controlling means comprises:

an adjustable amplifier responsive to a fourth control signal; and wherein the digital controller further comprises:

means for detecting an out-of-range level on the quantized digital output; and means for issuing the first and fourth control signals responsive to the detecting means for an out of range level.

8. A radio frequency channelized receiving and measurement system as defined in claim 7 wherein the out-of-range level detection means comprises:

a counter connected to an overflow bit in the Analog-to-Digital converter; and the means for issuing the first and fourth control signals is responsive to the number of counts in a preselected time.

9. An ILS calibrator comprising:

an input means for receiving a selected ILS channel frequency from an operator;

an analog radio frequency downconverter having a preselect filter means including a first band pass filter for frequencies of 108 to 112 MHz;

a second band pass filter for frequencies of 328 to 335 MHz; and a bypass connection, said first and second band pass filters and said bypass selectable through a first switch means responsive to a band select signal the preselect filter means providing a first internal output;

an attenuation means comprising at least four attenuators selectable by a second switch means and receiving said first internal output, said second switch means selectable by an attenuation select signal, the attenuation means providing a second internal output;

a local oscillator having at least four crystals, operating at 105.6 MHz, 114.6 MHz, 112.5 MHz, and 108.8 MHz, selectable by a switch means responsive to a local oscillator select signal, the local oscillator providing a local signal;

a mixer receiving the second internal output and the local oscillator signal and providing an IF output;

a band pass filter means for filtering the IF signal, the band pass filter means including a first band pass filter for frequencies of 2.5 to 3.5 MHz, a second band pass filter for frequencies of 4.5 to 5.5 MHz and a third band pass filter for frequencies of 6.5 to 7.5 MHz, said three band pass filters connectable through a switch means responsive to an IF select signal to selectably receive the IF signal and provide a video signal output; and a gain controlled amplifier receiving said video controlled output, the gain controlled amplifier responsive to a gain control signal; and a digital controller receiving an output from the gain controlled amplifier and having an Analog-to-Digital converter for quantizing the video signal and providing a digital output;

a numerically controlled oscillator multiplier receiving said digital output for translating the ILS channel frequency and providing in-phase and quadrature signal outputs;

a first digital decimation filter receiving the in-phase signal output and providing an in-phase decimated signal output;

a second digital decimation filter receiving the quadrature signal output and providing a quadrature decimated signal output;

a first twos compliment rectifier receiving the in-phase decimated signal and providing a rectified in-phase signal;

a first peak & hold circuit receiving the rectified in-phase signal and providing an in-phase envelope output;

a second twos compliment rectifier receiving the quadrature decimated signal and providing a rectified quadrature signal output;

a second peak & hold circuit receiving the rectified quadrature signal and providing a quadrature envelope output;

an envelop signal magnitude calculator receiving the quadrature envelope output and the in-phase envelope output and providing a signal magnitude;

a digital finite impulse response filter having a center frequency of 160 Hz receiving the signal magnitude and providing a first filtered output;

means for generating the band select signal, local oscillator select signal, and localizer glide slope select signal responsive to the selected ILS channel;

means for detecting an out-of-range level on said digitized output;

means for issuing said attenuation select signal and gain control signal responsive to said out-of-range detecting means;

a second finite impulse response filter having a center frequency of 3 Hz receiving the first filtered output and providing a second filtered output;

means for calculating RF level receiving the second filtered output and responsive to the attenuation select signal and the gain control signal for calculation of RF level;

a third finite impulse response filter having a 90 Hz pass band receiving the first filtered output and providing a first modulation level output;

a fourth finite impulse response filter having a pass band of 150 Hz receiving the first filtered output and providing a second modulation level output;

DDM calculation means receiving the first modulation level output, second modulation level output, and RF level for calculating percent modulation of the first modulation signal and second modulation signal and DDM of the signals; and, an output means receiving the DDM value for display to the operator.

* * * * *